(12) United States Patent
Takimoto et al.

(10) Patent No.: US 11,518,703 B2
(45) Date of Patent: Dec. 6, 2022

(54) METHOD FOR MANUFACTURING GLASS SHEET AND METHOD FOR MANUFACTURING DEVICE

(71) Applicant: Nippon Electric Glass Co., Ltd., Shiga (JP)

(72) Inventors: Hiroshi Takimoto, Shiga (JP); Taisei Matsubushi, Shiga (JP); Masao Nakajima, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/056,582

(22) PCT Filed: Jun. 11, 2019

(86) PCT No.: PCT/JP2019/023092
§ 371 (c)(1),
(2) Date: Nov. 18, 2020

(87) PCT Pub. No.: WO2019/244712
PCT Pub. Date: Dec. 26, 2019

(65) Prior Publication Data
US 2021/0206686 A1    Jul. 8, 2021

(30) Foreign Application Priority Data
Jun. 21, 2018    (JP) .............................. JP2018-118150

(51) Int. Cl.
*C03B 33/033*    (2006.01)
*B28D 1/22*    (2006.01)
(Continued)

(52) U.S. Cl.
CPC ............ *C03B 33/033* (2013.01); *B28D 1/225* (2013.01); *B28D 7/04* (2013.01); *C03B 33/04* (2013.01)

(58) Field of Classification Search
CPC ....... C03B 33/033; C03B 33/04; B28D 1/225; B28D 7/04; B28D 5/0011; B28D 5/0052;
(Continued)

(56) References Cited

U.S. PATENT DOCUMENTS 3,615,047 A * 10/1971 Feldman et al. ..... B28D 5/0047
                                                           225/1
3,880,337 A *  4/1975 Augustin ................ C03B 33/04
                                                       225/96.5
(Continued)

FOREIGN PATENT DOCUMENTS

JP    2015-79436     4/2015
WO    2011/155314   12/2011

OTHER PUBLICATIONS

International Search Report dated Aug. 13, 2019 in International (PCT) Application No. PCT/JP2019/023092.
(Continued)

*Primary Examiner* — Jonathan G Riley
(74) *Attorney, Agent, or Firm* — Wenderoth, Lind & Ponack, L.L.P.

(57) ABSTRACT

A method of manufacturing a glass sheet includes a start point forming step of forming a scribe line on a preset cutting portion of a glass sheet, a setting step of causing, through use of a support member having a groove-shaped recess, the support member to support the glass sheet having the scribe line formed thereon from one surface side so that the preset cutting portion is arranged on the recess, and a cutting step of generating a negative pressure in the recess to bend the preset cutting portion on the recess so that the one surface side protrudes, to thereby cut the glass sheet along the preset cutting portion with the scribe line as the start point. At the time of performing the cutting step, the entire recess is covered with a cover member from another (Continued)

surface side of the glass sheet through intermediation of the glass sheet.

11 Claims, 6 Drawing Sheets

(51) Int. Cl.
*B28D 7/04* (2006.01)
*C03B 33/04* (2006.01)

(58) Field of Classification Search
CPC .. Y10T 225/10; Y10T 225/12; Y10T 225/321
See application file for complete search history.

(56) References Cited

U.S. PATENT DOCUMENTS

| | | | |
|---|---|---|---|
| 2004/0144231 A1* | 7/2004 | Hanada | C03B 33/04 83/880 |
| 2012/0090183 A1* | 4/2012 | Cadden | B26B 25/00 30/279.2 |
| 2012/0318838 A1* | 12/2012 | Saitoh | C03B 33/04 225/2 |
| 2017/0275197 A1* | 9/2017 | Altman | C03B 33/091 |
| 2021/0206686 A1* | 7/2021 | Takimoto | B28D 7/04 |

OTHER PUBLICATIONS

International Preliminary Report on Patentability and Written Opinion of the International Searching Authority dated Dec. 22, 2020 in International (PCT) Application No. PCT/JP2019/023092.

\* cited by examiner

E-E

METHOD FOR MANUFACTURING GLASS SHEET AND METHOD FOR MANUFACTURING DEVICE

TECHNICAL FIELD

The present invention relates to a method of manufacturing a glass sheet and a method of manufacturing a device.

BACKGROUND ART

As is well known, in manufacturing of a glass sheet, a step of cutting out a glass sheet of a product size having a small area from a glass sheet having a large area is performed in some cases. One example of a procedure for performing such a step is disclosed in Patent Literature 1.

In the procedure disclosed in Patent Literature 1, first, a cutting line forming step of forming a cutting line on a preset cutting line forming a closed loop on a glass sheet is performed. Then, through use of a jig having a groove-shaped recess on a placement surface on which the glass sheet is to be placed, an arrangement step of placing the glass sheet having the cutting line formed thereon on the jig so that the preset cutting line is arranged on the recess is performed. Finally, a negative pressure is generated in the recess in a state of being covered with the glass sheet to bend a part (vicinity portion of the preset cutting line) on the recess in the glass sheet so that the part protrudes toward the recess side. In such a manner, a cutting step of cutting the glass sheet along the preset cutting line through use of the cutting line as a start point is performed.

Through use of the above-mentioned procedure, a part that is present on an inner side of the preset cutting line forming a closed loop on the glass sheet is cut out as a glass sheet of a product size.

CITATION LIST

Patent Literature

[PTL 1] WO 2011/155314 A1

SUMMARY OF INVENTION

Technical Problem

Incidentally, the above-mentioned procedure has the following problems to be solved.

Specifically, in the procedure, when the cutting step is completed, it is required to keep the negative pressure in the recess until the glass sheet is cut over a full length of the preset cutting line. In this case, cutting of the glass sheet gradually propagates along the preset cutting line through use of the cutting line as the start point, and hence the full length of the preset cutting line is not cut simultaneously. Therefore, after any portion on the preset cutting line is cut, an inside of the recess and an outside of the recess are spatially connected to each other through this portion, and thus the sealability in the recess is impaired. Consequently, gas flows into the recess before the cutting step is completed, with the result that it is difficult to keep the negative pressure in the recess, and an obstacle may be posed to cutting of the glass sheet in some cases.

In addition, in the procedure, a resin sheet is caused to stick to or adhere to the glass sheet before the cutting step. In this case, it is required to peel the resin sheet from the glass sheet after the cutting step. There is substantially no gap between cut surfaces of the glass sheet to be formed in the cutting step. Therefore, when the resin sheet is peeled from the glass sheet, there also arises a problem in that the cut surfaces rub against each other to degrade the quality of the cut surfaces.

The above-mentioned problems occur in the case of cutting out each device from a device base material including sheet-shaped devices (liquid crystal panels, organic EL panels, or the like) corresponding to a plurality of surfaces, as well as in the case of cutting out a glass sheet of a product size having a small area from a glass sheet having a large area. Specifically, when each device is cut out from the device base material, both glass sheets included in the device base material, which are arranged opposed to each other, may be cut along the preset cutting line through use of the above-mentioned procedure in some cases. Also in such a case, there similarly arise problems in that it is difficult to keep the negative pressure in the recess, and the cut surfaces of the glass sheets rub against each other to degrade the quality of the cut surfaces.

In view of the above-mentioned circumstances, the present invention has a technical object to achieve smooth cutting of a glass sheet and improve the quality of a cut surface by enabling, in the case of cutting the glass sheet through use of a negative pressure, the negative pressure to be kept until the cutting of the glass sheet is completed.

Solution to Problem

According to one embodiment of the present invention, which has been devised to achieve the above-mentioned object, there is provided a method of manufacturing a glass sheet, comprising: a start point forming step of forming a cutting start point on a preset cutting portion of a glass sheet; a setting step of causing, through use of a support member having a groove-shaped recess on a support surface configured to support the glass sheet, the support member to support the glass sheet having the cutting start point formed thereon from one surface side so that the preset cutting portion is arranged on the recess; and a cutting step of generating a negative pressure in the recess to bend the preset cutting portion on the recess so that the one surface side protrudes, to thereby cut the glass sheet along the preset cutting portion through use of the cutting start point as the start point, wherein, at the time of performing the cutting step, the entire recess is covered with a cover member from another surface side of the glass sheet through intermediation of the glass sheet.

In the above-mentioned method, by performing the setting step, the glass sheet having the cutting start point formed on the preset cutting portion in the start point forming step is supported by the support member from the one surface side. When the cutting step is started, the preset cutting portion on the recess is bent so that the one surface side protrudes due to the negative pressure generated in the recess, and the cutting of the glass sheet along the preset cutting portion through use of the cutting start point as the start point is started. When the entire recess is covered with the cover member from the another surface side of the glass sheet through intermediation of the glass sheet at the time of performing the cutting step, the following effect is obtained. Specifically, the entire recess is brought into a state of being covered with the cover member through intermediation of the glass sheet. Therefore, even when the entire preset cutting portion is not cut simultaneously, and any portion on the preset cutting portion is partially cut in advance, the situation in which an inside of the recess and an outside of the recess are spatially connected to each other through this portion can be avoided, and the sealability in the recess can be prevented from being impaired. The reason for this is that a gap formed along with the cutting (gap formed between opposed cut surfaces, which is hereinafter referred to as "gap between cut surfaces") is covered with the cover member from the another surface side. As a result, the negative pressure in the recess can be kept until the cutting of the glass sheet is completed (until the entire preset cutting portion is cut), and the smooth cutting of the glass sheet can be achieved. In addition, in the above-mentioned method, the cover member and the glass sheet are not adhered, and the another surface side of the glass sheet is simply covered with the cover member at the time of performing the cutting step. Therefore, the glass sheet after the cutting can be taken out by only removing the cover member after the cutting, and the cut surfaces can be prevented from rubbing against each other when the glass sheet is taken out. As a result, the quality of the cut surfaces of the obtained glass sheet can be improved.

In the above-mentioned method, it is preferred that the cover member comprise: a sheet member, which has flexibility and airtightness, and is configured to cover the recess through intermediation of the glass sheet; and a holding member, which has rigidity higher than rigidity of the sheet member, and is configured to hold the sheet member.

With this configuration, when the sheet member has flexibility, the gap between cut surfaces can be reliably covered with the cover member. The reason for this is as follows. The sheet member is sucked to the recess side through the gap between cut surfaces due to the negative pressure generated in the recess. Therefore, even when a cut portion (part obtained by cutting the preset cutting portion) is deformed due to the negative pressure, the sheet member comes into close contact with the cut portion while being deformed in conformity with the deformation of the cut portion. With this, the effect of keeping the negative pressure in the recess can be more suitably achieved. Further, when the holding member having rigidity higher than that of the sheet member holds the sheet member, the occurrence of a situation in which the sheet member is excessively sucked to intrude into the gap between cut surfaces can be suitably avoided. With this, the risk in that the glass sheet may be broken due to the intrusion of the sheet member into the gap between cut surfaces can be accurately eliminated.

In the above-mentioned method, it is preferred that the holding member be configured to hold the sheet member from a side opposite to the glass sheet while having the sheet member interposed between the holding member and the glass sheet in a thickness direction.

With this configuration, the sheet member is interposed between the holding member and the glass sheet. Therefore, the contact between the holding member and the glass sheet can be reliably avoided, and the breakage of the glass sheet, the occurrence of scratches, and the like caused by the contact can be suitably prevented.

In the above-mentioned method, it is preferred that the sheet member and the holding member be transparent.

With this configuration, both the sheet member and the holding member are transparent. Therefore, it can be easily grasped to which degree the cutting of the glass sheet along the preset cutting portion has propagated in plan view of the glass sheet at the time of performing the cutting step. With this, such an error that the covering of the recess with the cover member is cancelled before the entire preset cutting portion is cut (before completion of the cutting step) can be reliably prevented.

In the above-mentioned method, it is preferred that the sheet member be configured to cover the entire another surface of the glass sheet, and the sheet member have an edge portion fixed to the holding member.

With this configuration, the sheet member covers the entire another surface of the glass sheet. Therefore, irrespective of in which direction the preset cutting portion of the glass sheet extends, the cut portion obtained by cutting the preset cutting portion can be reliably covered only with the single sheet member. Further, the edge portion of the sheet member is fixed to the holding member. Therefore, even when the cover member is repeatedly used, wrinkles are less liable to be formed in the sheet member.

In the above-mentioned method, it is preferred that the sheet member have a Young's modulus of 0.5 GPa or more.

With this configuration, the occurrence of a situation in which the sheet member described above is excessively sucked to intrude into the gap between cut surfaces can be more suitably avoided.

In the above-mentioned method, the start point forming step may comprise forming, as the cutting start point, a scribe line forming a closed loop on the one surface side of the glass sheet.

With this configuration, the part that is present on an inner side of the scribe line forming a closed loop on the glass sheet can be cut out as the glass sheet having a shape corresponding to the locus of the scribe line.

In the above-mentioned method, the start point forming step may comprise forming, as the cutting start point, a first scribe line extending in a first direction on the one surface side of the glass sheet and a second scribe line extending in a second direction different from the first direction on the one surface side of the glass sheet and intersecting the first scribe line.

With this configuration, the glass sheet having a contour shape following each locus of the first scribe line and the second scribe line can be cut out.

In the above-mentioned method, it is preferred that both the first scribe line and the second scribe line be formed in the start point forming step so that both ends of the first scribe line and both ends of the second scribe line are prevented from projecting from the recess at the time of performing the setting step.

With this configuration, parts in the vicinity of both ends of the first scribe line in the preset cutting portion and parts in the vicinity of both ends of the second scribe line therein can be bent so that the one surface side thereof reliably protrudes. Therefore, the occurrence of a situation in which the cut portion is formed in such a manner as to deviate from the first scribe line or the second scribe line can be accurately avoided.

In the above-mentioned method, it is preferred that the recess of the support member have an opening width falling within a range of from 5 mm to 20 mm.

When the opening width of the recess of the support member is less than 5 mm, there is a risk in that the opposed cut surfaces may be brought into contact with each other to cause scratches in the cut portion. Meanwhile, when the opening width is more than 20 mm, there is a risk in that the cut surfaces may be brought into contact with the bottom of the recess to cause scratches. However, when the opening width is set to fall within a range of from 5 mm to 20 mm, the above-mentioned risk can be accurately eliminated.

Further, according to one embodiment of the present invention, which has been devised to achieve the above-mentioned object, there is provided a method of manufacturing a device, comprising cutting out a sheet-shaped device corresponding to a plurality of surfaces in a state of being partitioned by a preset cutting portion from a device base material along with cutting of each of glass sheets comprised in the device base material, which are arranged so as to be opposed to each other, as a sheet to be cut along the preset cutting portion, the method comprising: a start point forming step of forming a cutting start point on the preset cutting portion of the sheet to be cut; a setting step of causing, through use of a support member having a groove-shaped recess on a support surface configured to support the device base material, the support member to support the device base material from one surface side so that the preset cutting portion of the sheet to be cut, which has the cutting start point formed thereon, is arranged on the recess; and a cutting step of generating a negative pressure in the recess to bend the preset cutting portion on the recess so that the one surface side protrudes, to thereby cut the sheet to be cut along the preset cutting portion through use of the cutting start point as the start point, wherein, at the time of performing the cutting step, the entire recess is covered with a cover member from another surface side of the device base material through intermediation of the device base material.

According to the above-mentioned method, at the time of cutting the sheets to be cut, the action and effect described in the description as to the above-mentioned method of manufacturing a glass sheet can be obtained. With this, the smooth cutting can be achieved in each of both the glass sheets comprised in the device base material, and the quality of the cut surfaces can be improved.

Advantageous Effects of Invention

According to the present invention, the negative pressure can be kept until the cutting of the glass sheet is completed, and the smooth cutting of the glass sheet can be achieved. In addition, the quality of the cut surfaces of the obtained glass sheet can be improved.

BRIEF DESCRIPTION OF DRAWINGS

FIG. 2b is a vertical sectional front view for illustrating a cross-section taken along the line B-B of FIG. 2a.

FIG. 3b is a vertical sectional front view for illustrating a cross-section taken along the line C-C of FIG. 3a.

FIG. 5b is a vertical sectional front view for illustrating a cross-section taken along the line D-D of FIG. 5a.

FIG. 6b is a vertical sectional front view for illustrating a cross-section taken along the line E-E of FIG. 6a.

DESCRIPTION OF EMBODIMENTS

Now, a method of manufacturing a glass sheet and a method of manufacturing a device according to embodiments of the present invention are described with reference to the accompanying drawings.

First Embodiment

First, a method of manufacturing a glass sheet according to a first embodiment of the present invention is described. In this manufacturing method, an effective portion 3 (part to be a product later) is cut out from a glass sheet 1 by cutting the glass sheet 1 along a preset cutting portion 2.

Figure 3A:
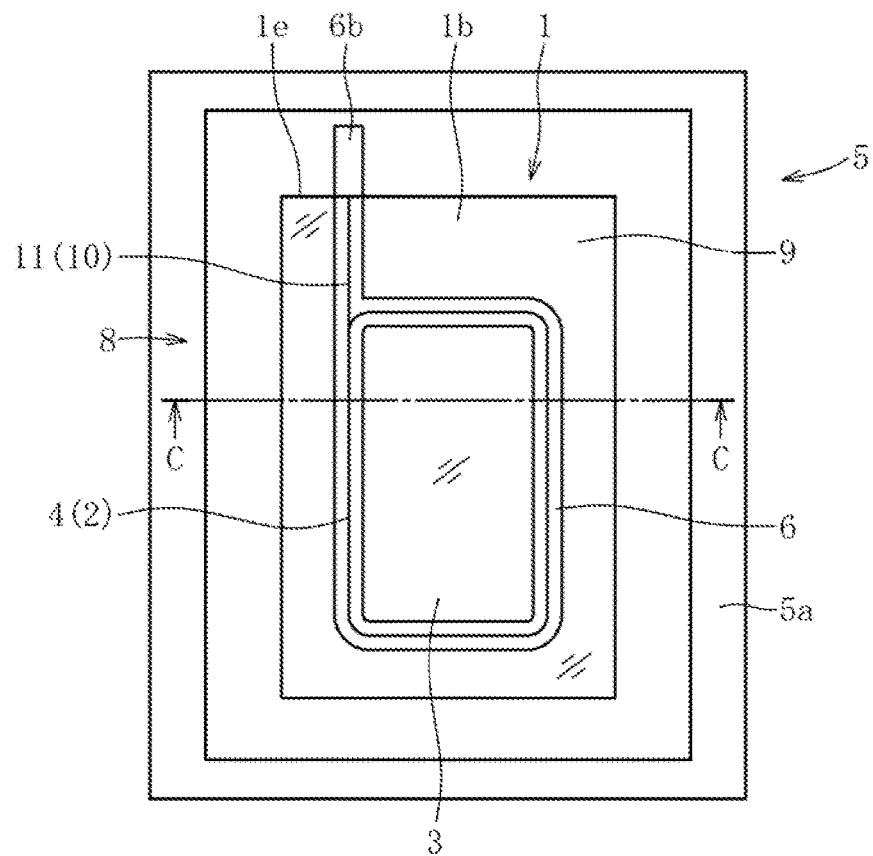
FIG. 3a is a plan view for illustrating a cover member to be used in a cutting step along with the setting step in the method of manufacturing a glass sheet according to the first embodiment of the present invention.
Figure 3B:
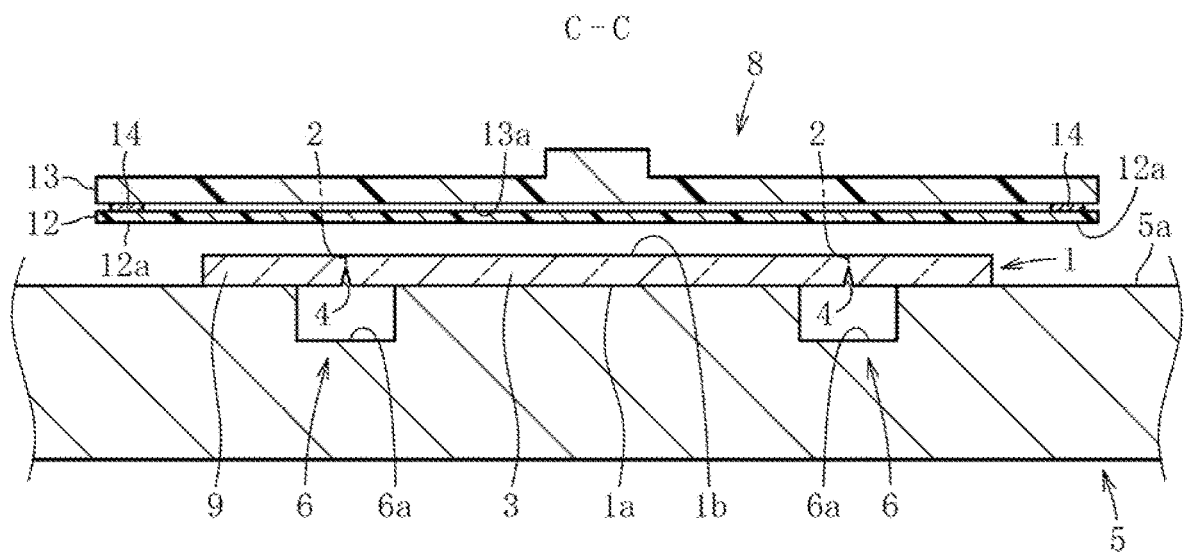
Figure 4A:
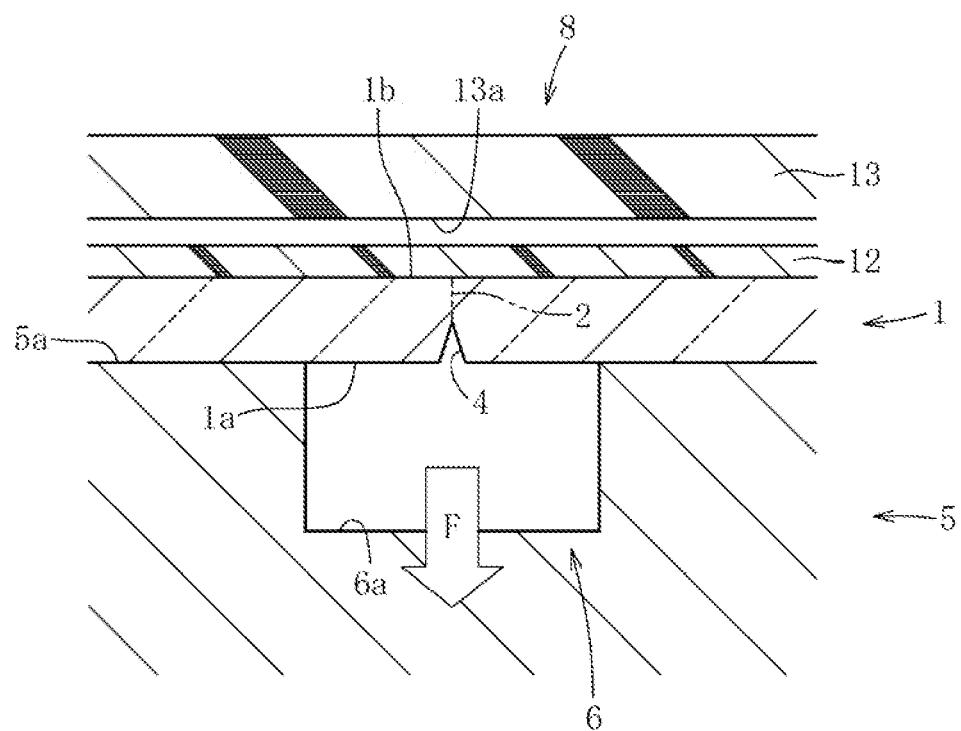
FIG. 4a is a vertical sectional front view for illustrating the cutting step in the method of manufacturing a glass sheet according to the first embodiment of the present invention.
Figure 4B:
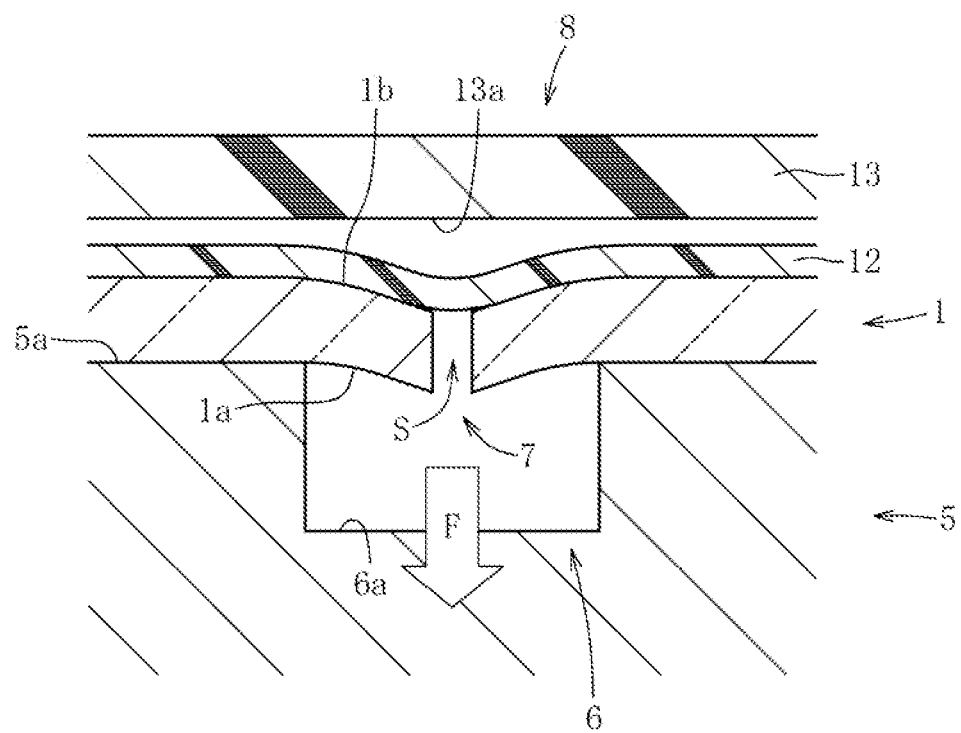
FIG. 4b is a vertical sectional front view for illustrating the cutting step in the method of manufacturing a glass sheet according to the first embodiment of the present invention.

The manufacturing method comprises a start point forming step of forming a scribe line 4 serving as a cutting start point on the preset cutting portion 2 of the glass sheet 1 (FIG. 1a to FIG. 1c), a setting step of causing a support member 5 to support the glass sheet 1 having the scribe line 4 formed thereon from one surface 1a side so that the preset cutting portion 2 of the glass sheet 1 is arranged on a recess 6 formed in the support member 5 (FIG. 3a and FIG. 3b), and a cutting step of generating a negative pressure in the recess 6 to bend the preset cutting portion 2 on the recess 6, to thereby cut the glass sheet 1 through use of the scribe line 4 as the start point (FIG. 4a and FIG. 4b). In this manufacturing method, in order to avoid the situation in which an inside and an outside of the recess 6 are spatially connected to each other through a cut portion 7 formed by cutting the preset cutting portion 2 at the time of performing the cutting step, the entire recess 6 (full length) is covered with a cover member 8 from another surface 1b side of the glass sheet 1 through intermediation of the glass sheet 1.

<Start Point Forming Step>

Figure 1A:
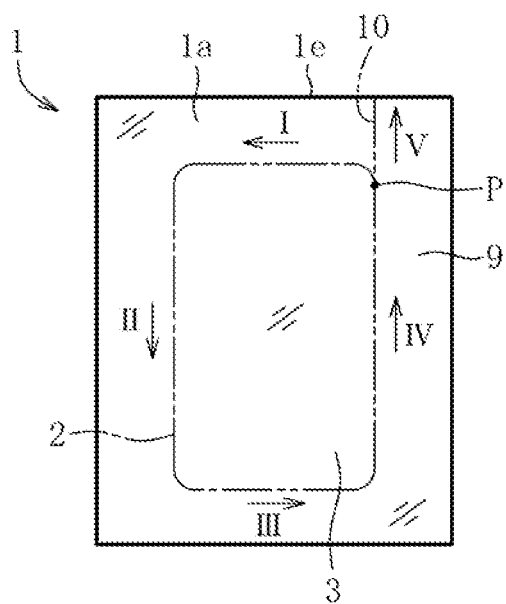
FIG. 1a is a plan view for illustrating a start point forming step in a method of manufacturing a glass sheet according to a first embodiment of the present invention.

As illustrated in FIG. 1a, the preset cutting portion 2 of the glass sheet 1 forms a closed loop in plan view. The preset cutting portion 2 serves as a boundary between the effective portion 3 of the glass sheet 1, which is present on an inner side of the closed loop, and a non-effective portion 9 (part to be discarded later) of the glass sheet 1, which is present on an outer side of the closed loop.

In the first embodiment, it is preferred that the glass sheet 1 to be cut have a rectangular shape and have a thickness of 200 μm or less. The thickness of the glass sheet 1 is more preferably 100 μm or less, still more preferably 50 μm or less. In addition, in the first embodiment, the effective portion 3 of the glass sheet 1 has a substantially rectangular shape having corner portions each bent in an arc shape at four corners.

In the start point forming step, for example, a forming tool, such as a scribe wheel or a diamond chip (single crystal diamond), is used for forming the scribe line 4. While the glass sheet 1 is pressed from the one surface 1a side with any of those forming tools, the forming tool is moved along the preset cutting portion 2. The forming tool is moved in the order indicated by the arrow I to the arrow IV through use of a point P on the preset cutting portion 2 as a starting point.

Figure 1B:
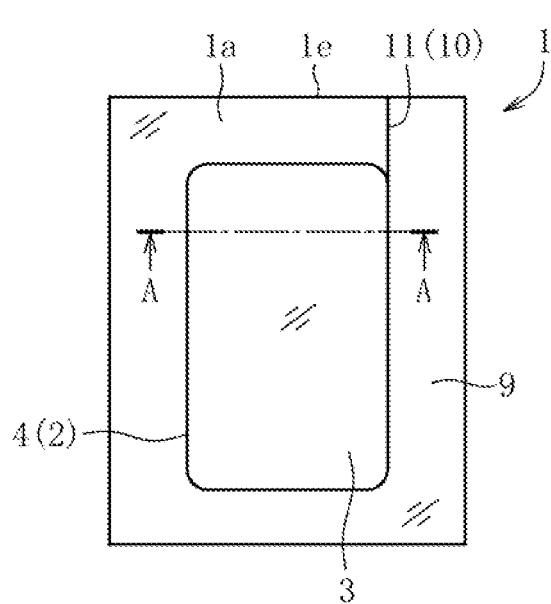
FIG. 1b is a plan view for illustrating the start point forming step in the method of manufacturing a glass sheet according to the first embodiment of the present invention.
Figure 1C:
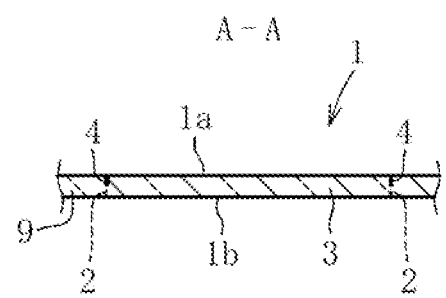
FIG. 1c is a vertical sectional front view for illustrating a cross-section taken along the line A-A of FIG. 1b.

After the forming tool is moved along the preset cutting portion 2, as indicated by the arrow V, the forming tool is continuously moved along an auxiliary preset cutting portion 10 which is continuous with an outside of the closed loop formed by the preset cutting portion 2 and which linearly extends up to an edge portion 1e of the glass sheet 1. With this, as illustrated in FIG. 1b and FIG. 1c, the scribe line 4 that forms the closed loop on the one surface 1a side of the glass sheet 1 and a linear auxiliary scribe line 11 continuous with the scribe line 4 are formed. Thus, the start point forming step is completed.

<Setting Step>

Figure 2A:
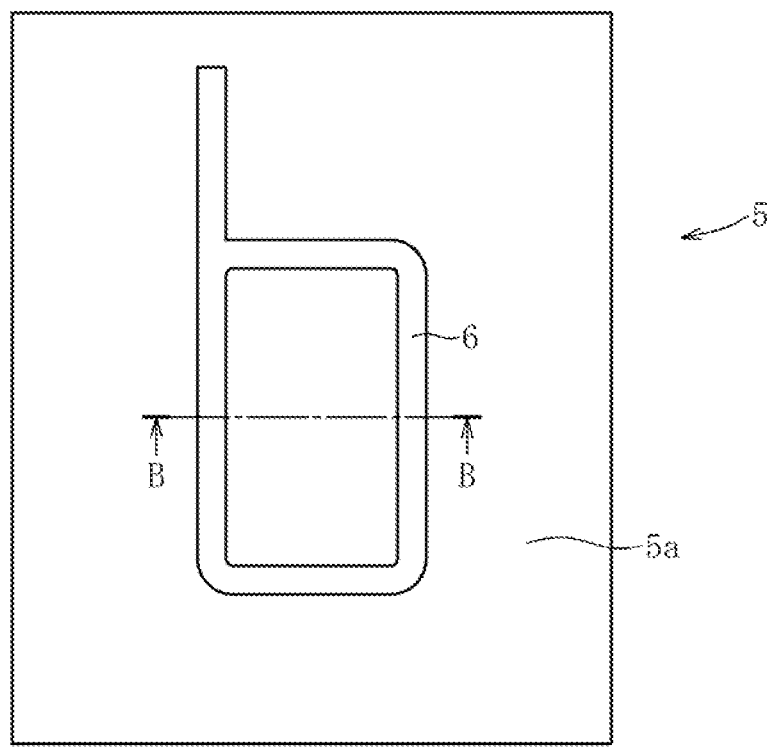
FIG. 2a is a plan view for illustrating a support member to be used in a setting step in the method of manufacturing a glass sheet according to the first embodiment of the present invention.
Figure 2B:
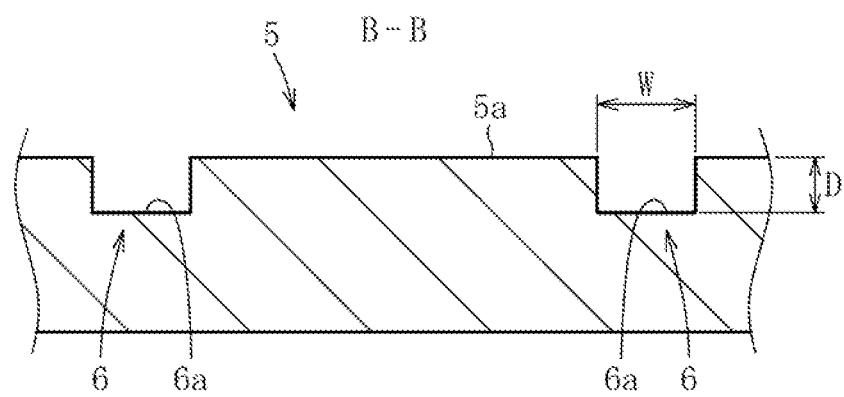

The support member 5 illustrated in FIG. 2a and FIG. 2b is used for performing the setting step. The support member 5 comprises a flat support surface 5a for supporting the glass sheet 1 in a horizontal posture and has the groove-shaped recess 6 on the support surface 5a. The recess 6 is formed so as to extend along the above-mentioned preset cutting portion 2 (scribe line 4) and the auxiliary preset cutting portion 10 (auxiliary scribe line 11) when the glass sheet 1 is supported by the support member 5. In the first embodiment, the support member 5 is made of a resin in order to prevent scratches and the like from occurring in the glass sheet 1 when the glass sheet 1 is placed on the support member 5 and has such rigidity (bending rigidity and torsional rigidity) that does not cause deformation, such as warpage, at the time of performing the manufacturing method. The support member 5 may be made of a metal, such as stainless steel and aluminum, instead of a resin.

The recess 6 has a rectangular contour shape in a cross-section orthogonal to a direction in which the groove extends. A large number of suction holes (not shown) are formed in an inner wall surface 6a of the recess 6, and each of the suction holes is connected to a negative pressure generation source (for example, a vacuum pump) (not shown). With this, when the negative pressure generation source is operated under a state in which the recess 6 is covered with the cover member 8 through intermediation of the glass sheet 1 at the time of performing the cutting step, gas in the recess 6 is sucked through the suction holes, and a negative pressure is generated in the recess 6 along with the suction of the gas.

In this case, an opening width W in the recess 6 falls preferably within a range of from 5 mm to 20 mm, more preferably within a range of from 7 mm to 15 mm. With this, the glass sheet 1 (preset cutting portion 2) can be suitably bent at the time of performing the cutting step, and the cut surfaces can be prevented from being brought into contact with the inner wall surface 6a of the recess 6. In addition, a depth D of the recess 6 is set to fall within a range of from 1 mm to 10 mm from the viewpoint of preventing the cut surfaces from being brought into contact with the inner wall surface 6a while preventing the thickness of the support member 5 from excessively increasing.

In the setting step, as illustrated in FIG. 3a and FIG. 3b, the glass sheet 1 is placed on the support member 5 so that the one surface 1a (surface on a side on which the scribe line 4 is formed) of the glass sheet 1 is brought into abutment against the support surface 5a of the support member 5. Further, the glass sheet 1 is placed on the support member 5 so that the scribe line 4 formed on the glass sheet 1 is positioned at the center of the opening width of the recess 6. Thus, the setting step is completed. In the first embodiment, apart of a portion of the recess 6 extending along the auxiliary scribe line 11 projects to an outside from the edge portion 1e of the glass sheet 1 (projecting portion of the recess 6 is hereinafter referred to as "projecting portion 6b").

Here, in the first embodiment, the one surface 1a of the glass sheet 1 and the support surface 5a of the support member 5 are brought into direct abutment against each other, but the present invention is not limited thereto. The one surface 1a of the glass sheet 1 and the support surface 5a of the support member 5 may be brought into indirect abutment against each other by interposing a sheet having air permeability between both the surfaces 1a and 5a.

<Cutting Step>

When the cutting step is performed, as preparation therefor, the glass sheet 1 on the support member 5 is covered with the cover member 8 from the another surface 1b side (surface on a side on which the scribe line 4 is not formed). Specifically, the glass sheet 1 is covered with a sheet member 12 (described later in detail) comprised in the cover member 8. In each of FIG. 3a and FIG. 3b, there is illustrated a state before the glass sheet 1 is covered with the cover member 8. A state after the glass sheet 1 is covered with the cover member 8 is illustrated in FIG. 4a.

The cover member 8 comprises the sheet member 12 having flexibility and airtightness and a holding member 13 configured to hold the sheet member 12. Both of the sheet member 12 and the holding member 13 are transparent (transmittance in a visible light range is 80% or more), and are each formed so as to have substantially the same size and shape in plan view.

The sheet member 12 has an area larger than that of the glass sheet 1, and can cover the entire another surface 1b of the glass sheet 1. In this case, a part of the sheet member 12 that projects to an outside from the edge portion 1e of the glass sheet 1 can be pressed so as to be brought into close contact with the support surface 5a of the support member 5. With this, the sheet member 12 can cover the above-mentioned projecting portion 6b as well as the glass sheet 1. Therefore, when the glass sheet 1 is covered with the cover member 8, the entire recess 6 can be sealed with both the glass sheet 1 and the sheet member 12. It is preferred that the sheet member 12 be slightly smaller than the support surface 5a of the support member 5, and it is preferred that the sheet member 12 not project from the support surface 5a of the support member 5. With this, the deformation amount of the sheet member 12 (intrusion amount of the sheet member 12 into the recess 6 through the cut portion 7) at the time of performing the cutting step becomes suitable. An edge portion 12a of the sheet member 12 is fixed to the holding member 13 through intermediation of a double-sided tape 14, and the sheet member 12 is held by the holding member 13 in a stretched state. In order to prevent impairment of the deformation (intrusion into the recess 6) of the sheet member 12, the double-sided tape 14 is provided at a position where the double-sided tape 14 is not arranged on the recess 6 (position where the double-sided tape 14 and the recess 6 do not overlap with each other in plan view). The Young's modulus of the sheet member 12 is preferably 0.5 GPa or more, more preferably 1.0 GPa or more, most preferably 2.0 GPa or more. With this, the deformation amount (intrusion amount into the recess 6) of the sheet member 12 at the time of performing the cutting step becomes suitable. Meanwhile, the Young's modulus of the sheet member 12 is preferably 10 GPa or less, more preferably 8 GPa or less, most preferably 6 GPa or less. With this, the deformation amount (intrusion amount into the recess 6) of the sheet member 12 at the time of performing the cutting step becomes suitable, and the sealability of the recess 6 can be suitably kept. It is preferred that the thickness of the sheet member 12 be from 1 µm to 100 µm from the viewpoint of the sealability of the recess 6 and the deformation amount of the sheet member 12. The sheet member 12 is made of, for example, a resin (Young's modulus: 4 GPa) having a thickness of 100 mm, such as polyethylene terephthalate (PET).

Here, in the first embodiment, the entire another surface 1b of the glass sheet 1 is covered with the cover member 8, but the present invention is not limited thereto. The cover member 8 (sheet member 12) may cover only the preset cutting portion 2 of the glass sheet 1.

The holding member 13 has rigidity higher than that of the sheet member 12, and has such rigidity (bending rigidity and torsional rigidity) that does not cause deformation, such as warpage, at the time of performing the manufacturing method. The holding member 13 is configured to hold the sheet member 12 from a side opposite to the glass sheet 1 while having the sheet member 12 interposed between the glass sheet 1 and the holding member 13 in a thickness direction. In the holding member 13, an opposing surface 13a opposed to the sheet member 12 is formed flat. The holding member 13 is made of, for example, a resin, such as an acrylic resin and polycarbonate. The thickness of the holding member 13 is preferably larger than that of the sheet member 12, specifically preferably from 0.5 mm to 10 mm from the viewpoint of keeping rigidity.

When the preparation for performing the cutting step is completed, as illustrated in FIG. 4a, the negative pressure generation source is operated to suck gas in the recess 6 in a sealed state as indicated by the arrow F, to thereby generate a negative pressure in the recess 6. Then, the preset cutting portion 2 on the recess 6 is bent so that the one surface 1a side protrudes through use of the negative pressure, and with a stress generated along with the bending, a median crack comprised in the scribe line 4 is caused to propagate in the thickness direction of the glass sheet 1. With this, the glass sheet 1 is cut along the preset cutting portion 2 through use of the scribe line 4 as the start point, to thereby form the cut portion 7 as illustrated in FIG. 4b.

Here, the glass sheet 1 is covered with the cover member 8 before the cutting step is performed. Therefore, the cut portion 7 formed by cutting the preset cutting portion 2 is covered with the cover member 8 from the another surface 1b side simultaneously with the formation thereof. With this, the sealability in the recess 6 is maintained. Even after the cut portion 7 is formed in advance in any portion on the preset cutting portion 2 forming a closed loop, the negative pressure generation source is continuously operated until the entire preset cutting portion 2 is cut. In this case, in a region in which the cut portion 7 has been formed, the sheet member 12 is sucked to the recess 6 side through a gap S formed between the opposed cut surfaces due to the negative pressure generated in the recess 6. Therefore, as illustrated in FIG. 4b, even when the cut portion 7 is deformed due to the influence of the negative pressure, the sheet member 12 comes into close contact with the cut portion 7 while being deformed in conformity with the deformation of the cut portion 7. With this, the sealability in the recess 6 is maintained more stably.

When the entire preset cutting portion 2 is cut, the cutting step is completed, with the result that the effective portion 3 and the non-effective portion 9 of the glass sheet 1 are separated, and the effective portion 3 is cut out from the glass sheet 1. After that, the cover member 8 is removed. The cover member 8 is not adhered to the glass sheet 1, and hence can be easily removed. With this, when the cover member 8 is removed, the risk in that the cut surfaces of the effective portion 3 and the non-effective portion 9 may rub against each other can be reduced. Then, the non-effective portion 9 is removed, to thereby take out the effective portion 3.

Now, the main action and effect of the above-mentioned manufacturing method are described.

According to the above-mentioned manufacturing method, the entire recess 6 is covered with the cover member 8 from the another surface 1b side of the glass sheet 1 through intermediation of the glass sheet 1 at the time of performing the cutting step. Therefore, the entire preset cutting portion 2 is not simultaneously cut, and even when any portion on the preset cutting portion 2 is partially cut in advance, the situation in which an inside of the recess 6 and an outside of the recess 6 are spatially connected to each other through this portion can be avoided. With this, the sealability in the recess 6 can be prevented from being impaired. As a result, the negative pressure in the recess 6 can be kept until the cutting of the glass sheet 1 is completed (until the entire preset cutting portion 2 is cut to form the cut portion 7), and thus the smooth cutting of the glass sheet 1 can be achieved. Further, the cover member 8 and the glass sheet 1 are not adhered, and hence the cover member 8 can be easily removed after the cutting. With this, when the cover member 8 is removed, the cut surfaces of the effective portion 3 and the non-effective portion 9 can be prevented from rubbing against each other.

Now, other embodiments of the present invention are described. Here, in the description of the other embodiments, elements that are substantially the same as those described in the above-mentioned first embodiment are denoted by the same reference symbols. Overlapping description thereof is omitted, and only the differences from the first embodiment are described.

Second Embodiment

Figure 5A:
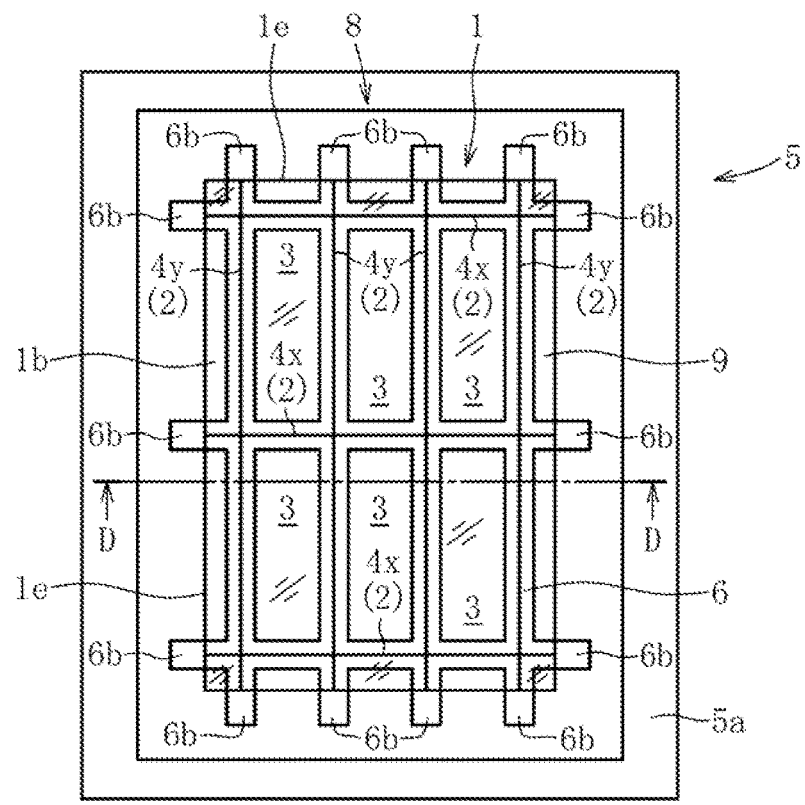
FIG. 5a is a plan view for illustrating a cover member to be used in a cutting step along with a setting step in a method of manufacturing a glass sheet according to a second embodiment of the present invention.
Figure 5B:
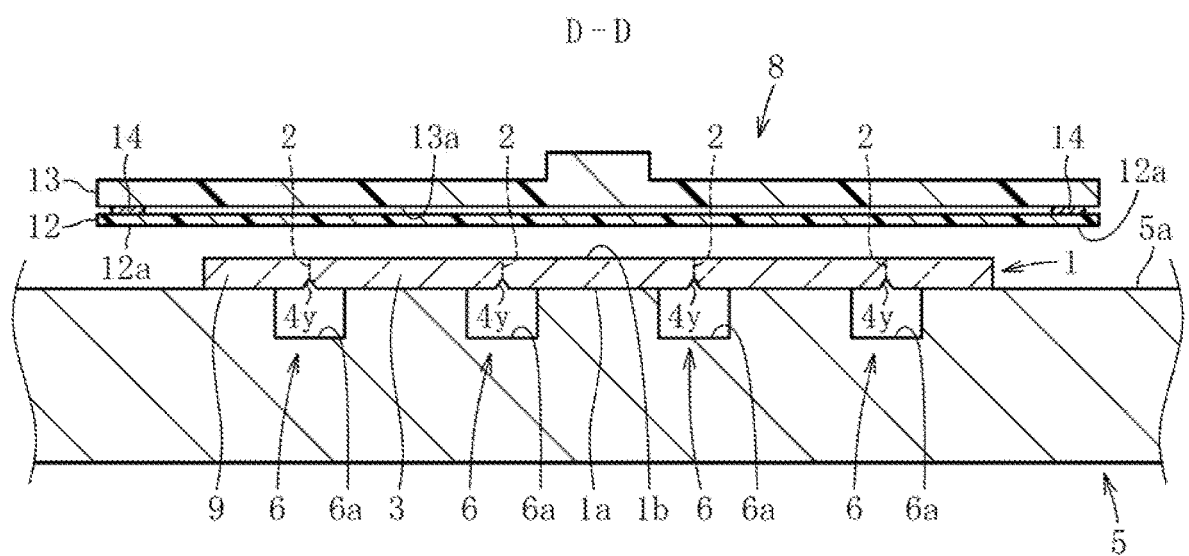

As illustrated in FIG. 5a and FIG. 5b, a method of manufacturing a glass sheet according to a second embodiment of the present invention is different from the above-mentioned first embodiment mainly in that the preset cutting portions 2 of the glass sheet 1 linearly extend vertically and horizontally without forming a closed loop, and the recesses 6 are formed vertically and horizontally so as to extend along the preset cutting portions 2 when the glass sheet 1 is supported by the support member 5 (at the time of performing the setting step).

In the start point forming step in the second embodiment, both first scribe lines 4x and second scribe lines 4y are formed as cutting start points on the one surface 1a side of the glass sheet 1. The first scribe lines 4x each extend in a first direction. Meanwhile, the second scribe lines 4y each extend in a second direction orthogonal to the first direction, and are each orthogonal to the first scribe lines 4x. In the second embodiment, three first scribe lines 4x and four second scribe lines 4y are formed. Needless to say, the number of each of the scribe lines 4x and 4y is not limited to this, and may be appropriately increased or decreased. In addition, the scribe lines 4x and 4y may not be orthogonal to each other.

In the second embodiment, the first scribe line 4x and the second scribe line 4y are each formed in a so-called outer cut form, and are formed from one edge portion 1e to another edge portion 1e, which are opposed to each other, of the glass sheet 1 along the first direction and the second direction, respectively. The full length of each of the first scribe line 4x and the second scribe line 4y is smaller than that of the recesses 6 extending in the first direction and the second direction. Thus, at the time of performing the setting step, both ends of each of the first scribe line 4x and the second scribe line 4y do not project from the recesses 6. In other words, at the time of performing the setting step, both ends of the recess 6 extending in the first direction and both ends of the recess 6 extending in the second direction project from the edge portions 1e of the glass sheet 1 as the projecting portions 6b.

Also in the second embodiment, the same action and effect as those in the above-mentioned first embodiment can be obtained. In the second embodiment, through cutting of the glass sheet 1 along the preset cutting portions 2, regions corresponding to six surfaces at the center surrounded by the scribe lines 4x and 4y in the glass sheet 1 are each cut out as a rectangular glass sheet (effective portion 3). Meanwhile, an entire region surrounding the regions corresponding to the six surfaces (entire region comprising the edge portions 1e of the glass sheet 1) serves as the non-effective portion 9.

Third Embodiment

Figure 6A:
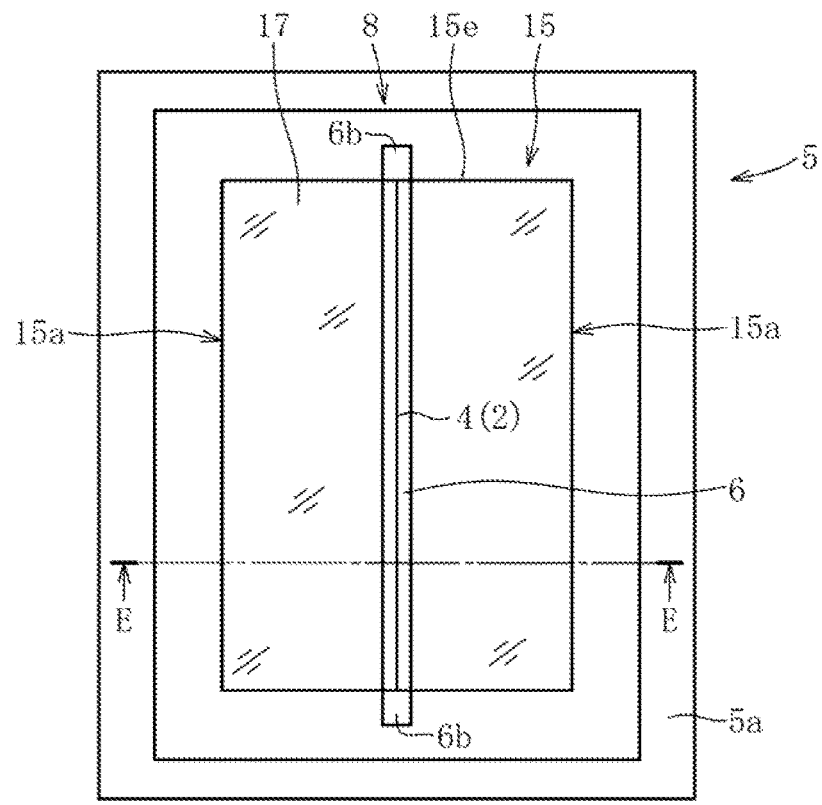
FIG. 6a is a plan view for illustrating a cover member to be used in a cutting step along with a setting step in a method of manufacturing a device according to a third embodiment of the present invention.
Figure 6B:
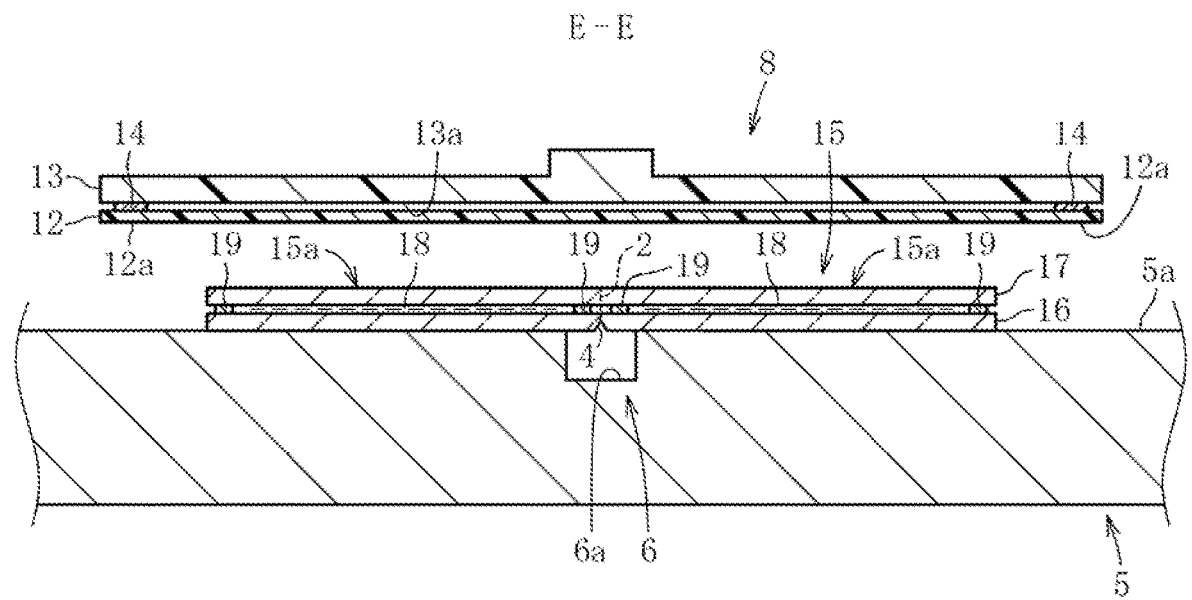

As illustrated in FIG. 6a and FIG. 6b, a method of manufacturing a device according to a third embodiment of the present invention is different from the above-mentioned first embodiment mainly in that an object to be cut is not a glass sheet, but a liquid crystal panel base material 15 serving as a device base material, the preset cutting portion 2 linearly extends without forming a closed loop, and the recess 6 is linearly formed so as to extend along the preset cutting portion 2 when the liquid crystal panel base material 15 is supported by the support member 5.

The liquid crystal panel base material 15 comprises liquid crystal panels 15a corresponding to two surfaces in a state of being partitioned by the preset cutting portion 2. Each of the liquid crystal panels 15a comprises a first glass sheet 16, a second glass sheet 17 opposed to the first glass sheet 16, and a seal member 19 configured to seal a liquid crystal 18 between the glass sheets 16 and 17. In the third embodiment, the liquid crystal panel base material 15 comprises the liquid crystal panels 15a corresponding to two surfaces, but may comprise the liquid crystal panels 15a corresponding to a larger number of surfaces. In this case, the preset cutting portions 2 may linearly extend vertically and horizontally. Further, besides the liquid crystal panel base material, an organic EL panel base material and the like may be set to an object to be cut as a device base material.

In the third embodiment, along with successive cutting of each of the glass sheets 16 and 17 comprised in the liquid crystal panel base material 15 as a sheet to be cut along the preset cutting portion 2, each of the liquid crystal panels 15a serving as a device is cut out from the liquid crystal panel base material 15 to be manufactured. Specifically, of the glass sheets 16 and 17, first, the scribe line 4 is formed along the preset cutting portion 2 through use of the first glass sheet 16 as a sheet to be cut, and then, the first glass sheet 16 is cut through use of the scribe line 4 as a start point. Next, after front and back sides of the liquid crystal panel base material 15 are reversed, the second glass sheet 17 is cut as a sheet to be cut in the same mode as in the first glass sheet 16.

The mode for cutting a sheet to be cut complies with the mode for cutting the glass sheet 1 in the above-mentioned first embodiment except for the following two points (1) and (2). (1) In the start point forming step, the scribe line 4 is linearly formed from one edge portion 15e to another edge portion 15e, which are opposed to each other, of the sheet to be cut. (2) At the time of performing the cutting step, the entire recess 6 is covered with the cover member 8 from another surface side (side of the glass sheet that is not the sheet to be cut among the glass sheets 16 and 17) of the liquid crystal panel base material 15 through intermediation of the liquid crystal panel base material 15.

According to the third embodiment described above, when the sheet to be cut is cut, the same action and effect as those in the above-mentioned first and second embodiments can be obtained. With this, the smooth cutting of each of the glass sheets 16 and 17 comprised in the liquid crystal panel base material 15 can be achieved, and the quality of cut surfaces can be improved.

Here, the method of manufacturing a glass sheet and the method of manufacturing a device according to the present invention are not limited to the modes described in the above-mentioned embodiments. For example, a cover member comprising a frame serving as a holding member and a sheet member having an edge portion fixed to the frame may be used instead of the cover member described in the above-mentioned embodiments. In this case, when the sheet member is transparent, the glass sheet and the device base material can be visually recognized in plan view at the time of performing the cutting step, and hence the frame may not be transparent.

In addition, in the above-mentioned embodiments, the scribe line is formed as the cutting start point on the preset cutting portion of the glass sheet (sheet to be cut), but the present invention is not limited thereto. For example, a through hole that penetrates through the glass sheet (sheet to be cut) in the thickness direction may be formed as the cutting start point.

REFERENCE SIGNS LIST 1 glass sheet
1a one surface
1b another surface
2 preset cutting portion
4 scribe line
4x first scribe line
4y second scribe line
5 support member
5a support surface
6 recess
7 cut portion
8 cover member
12 sheet member
12a edge portion
13 holding member
15 liquid crystal panel base material (device base material)
15a liquid crystal panel (device)
16 first glass sheet
17 second glass sheet
W opening width

The invention claimed is:

1. A method of manufacturing a glass sheet, the method comprising:
   a start point forming step of forming a cutting start point on a preset cutting portion of a glass sheet;
   a setting step of causing, through use of a support member having a groove-shaped recess on a support surface configured to support the glass sheet, the support member to support the glass sheet having the cutting start point formed thereon from one surface side so that the preset cutting portion is arranged on the recess; and a cutting step of generating a negative pressure in the recess to bend the preset cutting portion on the recess so that the one surface side protrudes, to thereby cut the glass sheet along the preset cutting portion through use of the cutting start point as a start point, wherein, at the time of performing the cutting step, an entirety of the recess is covered with a cover member from another surface side of the glass sheet with the glass sheet located between the cover member and the support member, wherein, at the time of performing the cutting step, the cover member and the glass sheet are not adhered, and wherein, in the setting step, the glass sheet is supported in direct contact with the support surface of the support member.

2. The method of manufacturing a glass sheet according to claim 1, wherein the cover member comprises:

a sheet member, which has flexibility and airtightness, and is configured to cover the recess with the glass sheet located between the sheet member and the support member; and a holding member, which has rigidity higher than rigidity of the sheet member, and is configured to hold the sheet member.

3. The method of manufacturing a glass sheet according to claim 2, wherein the holding member is configured to hold the sheet member from a side opposite to the glass sheet while having the sheet member interposed between the holding member and the glass sheet in a thickness direction.

4. The method of manufacturing a glass sheet according to claim 3, wherein the sheet member and the holding member are transparent.

5. The method of manufacturing a glass sheet according to claim 2, wherein the sheet member is configured to cover an entirety of another surface of the glass sheet, and wherein the sheet member has an edge portion fixed to the holding member.

6. The method of manufacturing a glass sheet according to claim 2, wherein the sheet member has a Young's modulus of 0.5 GPa or more.

7. The method of manufacturing a glass sheet according to claim 1, wherein the start point forming step comprises forming, as the cutting start point, a scribe line forming a closed loop on the one surface side of the glass sheet.

8. The method of manufacturing a glass sheet according to claim 1, wherein the start point forming step comprises forming, as the cutting start point, a first scribe line extending in a first direction on the one surface side of the glass sheet and a second scribe line extending in a second direction different from the first direction on the one surface side of the glass sheet and intersecting the first scribe line.

9. The method of manufacturing a glass sheet according to claim 8, wherein both the first scribe line and the second scribe line are formed in the start point forming step with lengths so that both ends of the first scribe line and both ends of the second scribe line are prevented from projecting from the recess at the setting step.

10. The method of manufacturing a glass sheet according to claim 1, wherein the recess of the support member has an opening width falling within a range of from 5 mm to 20 mm.

11. A method of manufacturing a device, comprising cutting out a sheet-shaped device corresponding to a plurality of surfaces in a state of being partitioned by a preset cutting portion from a device base material along with cutting of each of glass sheets comprised in the device base material, which are arranged so as to be opposed to each other, as a sheet to be cut along the preset cutting portion, the method comprising:

a start point forming step of forming a cutting start point on the preset cutting portion of the sheet to be cut;

a setting step of causing, through use of a support member having a groove-shaped recess on a support surface configured to support the device base material, the support member to support the device base material from one surface side so that the preset cutting portion of the sheet to be cut, which has the cutting start point formed thereon, is arranged on the recess; and a cutting step of generating a negative pressure in the recess to bend the preset cutting portion on the recess so that the one surface side protrudes, to thereby cut the sheet to be cut along the preset cutting portion through use of the cutting start point as a start point, wherein, at the time of performing the cutting step, an entirety of the recess is covered with a cover member from another surface side of the device base material with the device base material located between the cover member and the support member, wherein, at the time of performing the cutting step, the cover member and the device base material are not adhered, and wherein, in the setting step, the sheet to be cut is supported in direct contact with the support surface of the support member.

* * * * *